No. 773,700. PATENTED NOV. 1, 1904.
C. F. AMES & H. A. REARSON.
CAMERA.
APPLICATION FILED MAY 15, 1902.
NO MODEL. 4 SHEETS—SHEET 1.
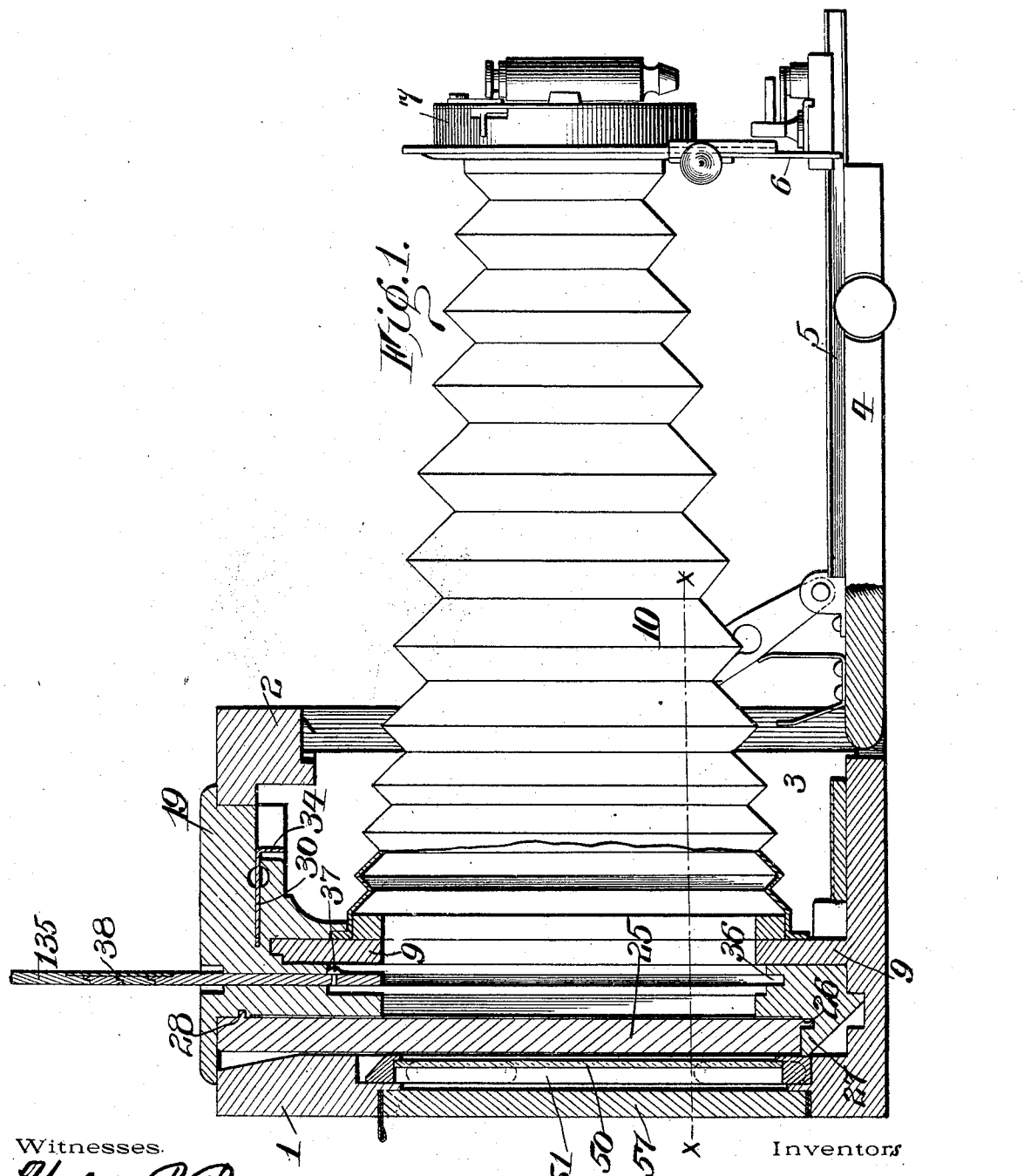

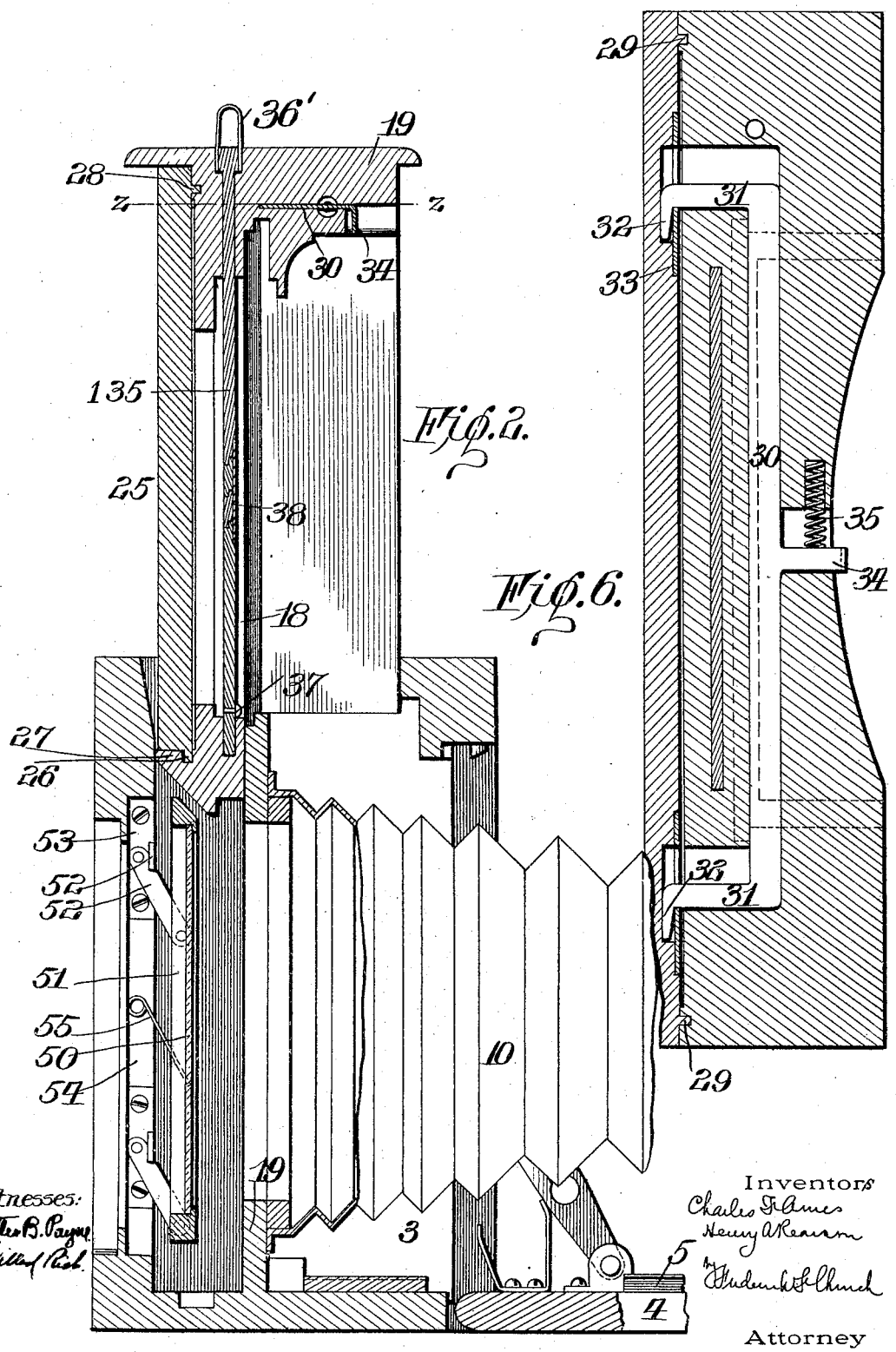

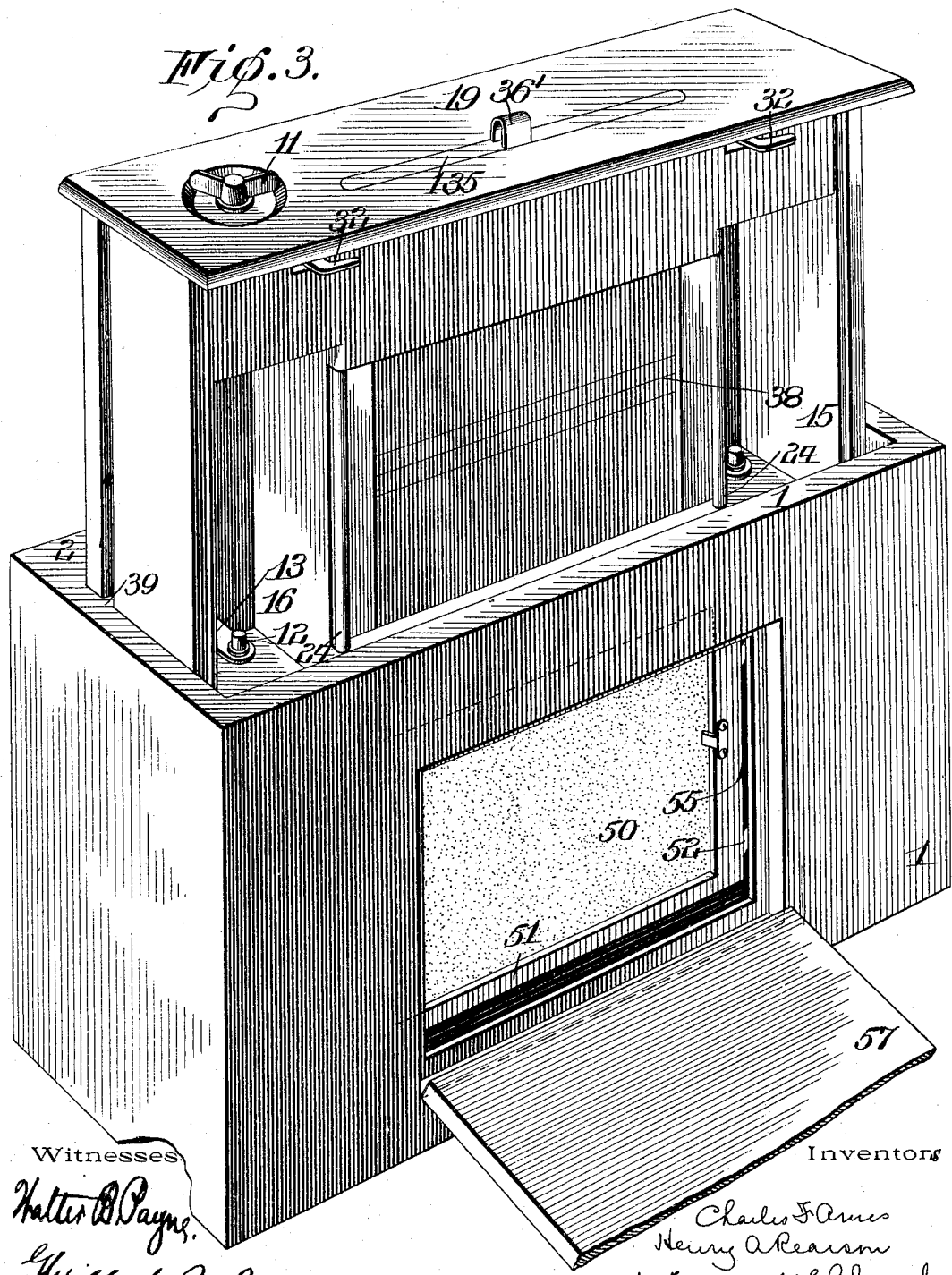

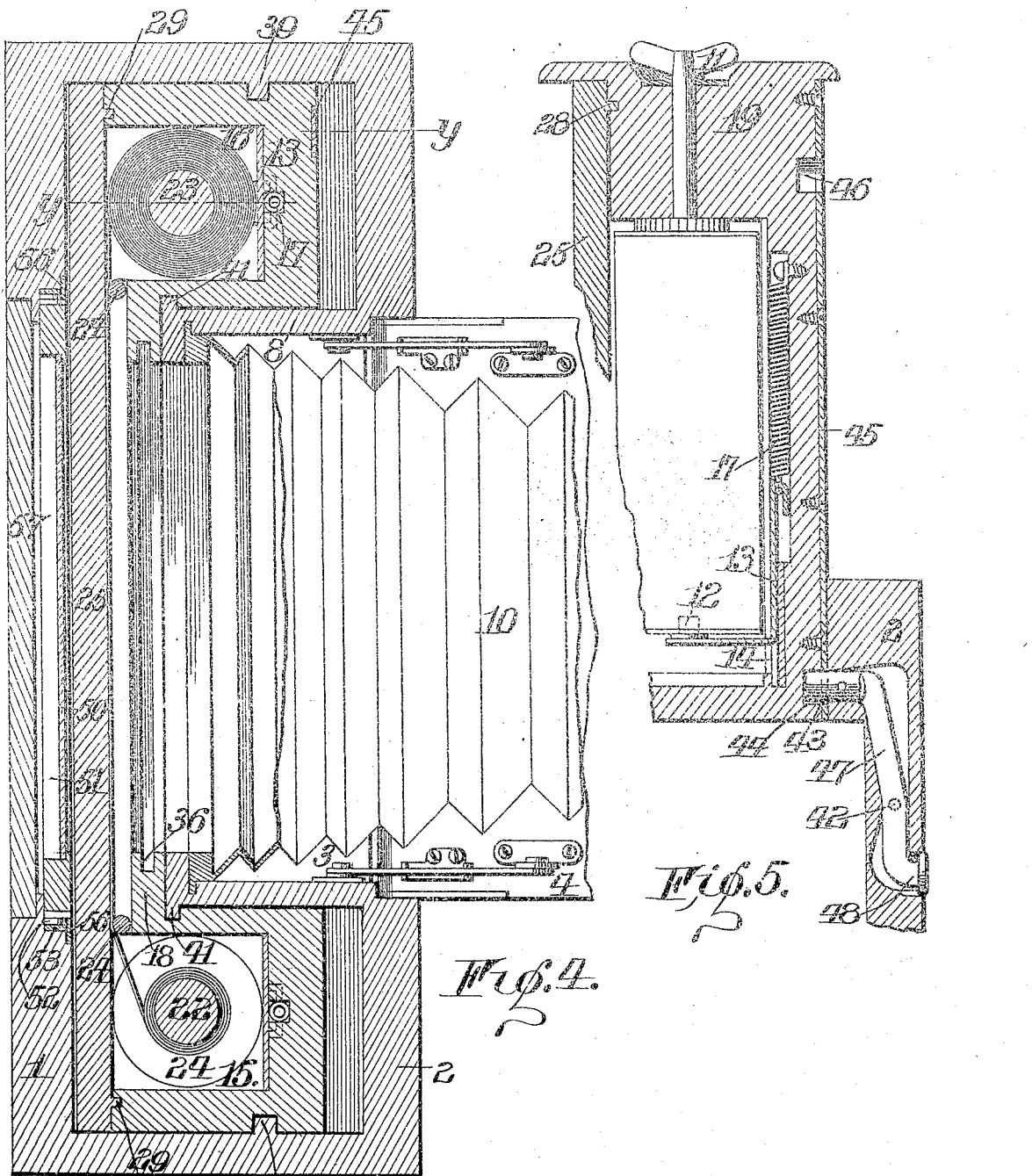

No. 773,700. Patented November 1, 1904.

UNITED STATES PATENT OFFICE.

CHARLES F. AMES AND HENRY A. REARSON, OF ROCHESTER, NEW YORK, ASSIGNORS TO BLAIR CAMERA COMPANY, OF ROCHESTER, NEW YORK, A CORPORATION OF NEW YORK.

CAMERA.

SPECIFICATION forming part of Letters Patent No. 773,700, dated November 1, 1904.

Application filed May 15, 1902. Serial No. 107,432. (No model.)

*To all whom it may concern:*

Be it known that we, CHARLES F. AMES and HENRY A. REARSON, of Rochester, in the county of Monroe and State of New York, have invented certain new and useful Improvements in Cameras; and we do hereby declare the following to be a full, clear, and exact description of the same, reference being had to the accompanying drawings, forming a part of this specification, and to the reference-numerals marked thereon.

Our present invention relates to cameras, and particularly to that class known as "roll-holders" or "film-cameras," in which a cartridge composed of a continuous strip of sensitized film or paper is employed and which is arranged in a roll or upon a spool carried at one side of the camera and transferred or wound upon a similar spool upon the opposite side as successive exposures are made.

Our invention has for its object to provide a camera in which rolls of sensitized film or paper may be employed and which is so constructed that the film or paper may be moved out of alinement with the lens and a focusing-screen which will be moved, preferably automatically operated, by the movement of such parts to permit the lens to be first properly focused before an exposure is made.

To these and other ends the invention consists in certain improvements hereinafter described, the novel features being pointed out in the claims at the end of this specification.

In the drawings, Figure 1 is a longitudinal sectional view of a camera constructed in accordance with our invention, showing the parts in the normal position for making an exposure. Fig. 2 is a similar view showing the film or roll-holder in the elevated position. Fig. 3 is an enlarged perspective view of the rear side of the camera, showing the rear cover of the roll-holder removed. Fig. 4 is a cross-sectional view on the line *x x* of Fig. 1. Fig. 5 is a vertical sectional view on the line *y y* of Fig. 4, and Fig. 6 is a horizontal sectional view on the line *z z* of Fig. 2.

Similar reference-numerals in the several figures indicate similar parts.

A camera embodying our improvements embodies a casing having the forward and rear sides 1 and 2, respectively, and the latter is provided with a central aperture 3, which is normally closed by a drop front or door 4. In the several figures the door is shown in the open position, and on its upper side it is provided with ways 5, upon which is mounted a sliding supporting-frame 6, carrying the lens-casing 7. Extending rearwardly from the aperture in the front 2 is a recess or chamber having the side walls 8 and the rear wall or frame 9 containing the exposure-aperture, and to this frame is attached the rear end of the usual collapsible bellows 10, which is also connected at its forward end to the lens-casing 7.

In order that the film-spools and the film may be moved out of alinement with the exposure-aperture in the wall 9, they are mounted in a separately vertically movable roll holder or casing, which latter embodies the film-chamber 15 at one end and the receiving-chamber 16 at the opposite end, said chambers being arranged at opposite sides of the recess in the main casing, and they are connected by means of a vertically-extending wall 18, lying in the rear of the wall 9 and provided with a similar aperture, and over the tops of the chambers extends a top portion or cover 19. The sensitized film or paper, preferably the ordinary cartridge-film embodying a strip of film and a cover of opaque paper, is upon the spool 22, located in the chamber 15, and extends across the rear side of the wall 18 over small rollers or idlers 24 at the ends of the wall, and it is received upon the winding-spool 23 in the chamber 16, as shown particularly in Fig. 4. Suitable centering and securing devices for the spools are provided, and in the chamber 16 is a key 11 accessible from the exterior and adapted to engage the upper end of the winding-spool 23. The lower end of the spool is engaged by a centering-pin 12 on a vertically-movable arm 13, sliding in ways or guides 14 and held in the normal position by a spring 17. The rear side of the supplemental casing or roll-holder is provided with a removable back 25, having at its lower edge a tongue 26, engaging a suitable groove formed in the rearwardly-extending lip 27 at the lower end of the wall 18, and at its upper side the back portion is provided with a small tongue 28 and at the sides with similar tongues 29, whereby the passage of light to the interior of the holder is effectually prevented. In order to secure the back 25 in its normal position, a simple locking device, such as illustrated in Fig. 6, is provided, consisting of a bar 30, having rearwardly-extending arms 31, provided with hooks or projections 32 at their ends adapted to engage beneath the edges of plates 33, secured upon the interior of the back portion.

34 indicates an operating lip or extension on the bar 30, arranged centrally between the film-chambers, whereby the bar may be operated to disengage the hooks or projections 32 from the plates 33 and with which they are normally held in contact by means of a spring 35, operating the bar in one direction, as shown. In order that the portion of film extending between the chambers and across the aperture in the wall 18 may be protected when the roll-holder is elevated or moved out of line with the lens, we employ a slide 135. This slide operates vertically through an aperture in the top 19, and grooves or channels 36 are arranged in the wall at the sides and bottom of the aperture, so that when the slide is down, as shown in Figs. 2 and 3, the aperture in said wall is effectually closed. At the upper end of the slide is provided a loop or handle 36', by means of which it may be elevated and removed from in front of the film; but as it is unnecessary that the slide be removed entirely from the casing a stop in the form of a pin 37 is provided to limit its upward movement. For the convenience of the operator in manipulating the camera the slide is provided at about its middle point with hinged or jointed sections 38, whereby it may be folded down upon the top of the casing when it is withdrawn.

The roll-holder or supplemental casing may be guided in its vertical movement in any suitable manner, and in the present instance tongues or guides 39 on the camera-casing are shown engaging ways formed in the roll-holder outside and forward of the spool-chambers, and in the inner sides of the latter are similar recesses in which engage tongues 41, projecting outwardly from the edges of the back portion 9 of the exterior casing. The roll-holder is held in its upper and lower positions by means of a spring-operated latch 42, having the end 43, adapted to engage a recess 44 in the lower end of the plate 45 at one end of the roll-holder casing to hold the latter in the elevated position when focusing, and also adapted to engage a similar recess 46 to retain the casing when in the lower or picture-taking position. The latch 42 is pivoted at 47 and is also provided with a button or head 48, whereby it may be conveniently operated from the exterior of the main casing to disengage its operating end 43, and, if desired, permit its entire removal.

In order that the operator may determine when the lens is properly focused, a ground-focusing screen 50, supported in a frame 51, is adapted to be projected in the plane of the sensitized film when the supplemental casing is moved upwardly, and to accomplish this object the frame is supported at its ends upon arms or links 52. These links are capable of a parallel movement and are pivoted to the upper and lower side of the frame, and are also pivoted upon brackets 53, located at the side of a recess 54, formed at the inner side of the portion 1 of the main casing. The focusing-screen normally lies in this recess, as shown in Figs. 1 and 4; but when the roll-holder casing is moved from its position of use it is projected beneath the latter by means of a spring 55. Small stops or projections 56 on the brackets 53, engaging the arms 52, limit its inward movement, so that the surface of the screen is accurately positioned, as will be understood. In rear of the aperture or recess 54 is arranged a door or closure 57, hinged at its lower end and adapted to be opened outwardly, as shown particularly in Fig. 3, to expose the screen so that the operator may have a clear and unobstructed view while adjusting the lens relatively thereto in order that a clear-cut and accurately-defined picture may be obtained. The focusing-screen is projected beneath the roll-holder by the spring 55, as described and shown particularly in Fig. 2, and to cause it to be automatically returned to its normal position the lower edge of said wall and the coöperating upper edge of the frame 51 is beveled, so that when the holder is moved downwardly the focusing-screen will be moved rearwardly upon the links or supporting-arms 52, and as the back of the holder passes over the frame 51 it will be held in the recess 54 until the holder is again removed.

A camera such as we have shown and described, embodying the roll-holder provided in a separate casing which may be moved out of alinement with the lens, enables a focusing-screen to be employed, so that the operator may determine not only the size of the picture he can obtain, but he will be guided in locating any particular object at the exact point upon the negative that he may desire. Further, he will be guided in the adjustment of the lens relatively to the screen to produce a clear and distinct image thereon, which will be subsequently produced upon the negative when the parts are returned to their normal position and the proper exposure is made.

The roll-holder is so arranged in the camera that it occupies but little room and does not interfere with the focusing operation, and while it is intended to remain as a part of the camera it may be removed, if desired, for reloading, although this is not necessary, as the back cover may be removed for the purpose when the holder is elevated, as shown in Fig. 3. The markings on the back of the paper covering of the film may be inspected through a suitable aperture formed in the rear cover or door 25, as is usual in cartridge-cameras.

What we claim as our invention is—

1. In a photographic camera, the combination with a casing provided with the lens and a focusing-screen movable relatively thereto, of guides on the casing, a holder for sensitized material mounted in the guides and movable into and out of alinement with the lens and means operating between the screen and plate-holder whereby the former is automatically moved out of the path of the holder as the latter is moved into the operative position.

2. In a photographic camera, the combination with a casing having guides thereon, a focusing-screen movably mounted on the casing and means for projecting it inwardly, of a holder for sensitized material supported in the guides and movable transversely of the casing and inclined surfaces on the screen and holder adapted to coöperate to move the former rearwardly when the latter is moved into its normal position.

3. In a photographic camera, the combination with a main casing and a supplemental casing movable transversely thereof having film-chambers at the ends, and provided with an exposure-aperture located between the chambers and a slide for closing the aperture, of a focusing-screen movably mounted on the main casing, devices for projecting it in the path of the supplemental casing when the latter is moved outwardly and devices for returning the screen to its normal position when said casing is moved inwardly.

4. In a photographic camera, the combination with a main casing having the forward side provided with a lens and the rear side provided with a recess, of a holder for sensitized material arranged between the forward and rear sides and movable transversely of the casing, a focusing-screen normally lying in the recess, supports for the screen and means for moving it inwardly when the supplemental casing is moved outwardly.

5. In a photographic camera, the combination with a casing having at the forward side a lens and at the rear having an aperture and a recess surrounding the latter at the interior of the casing, of a holder for sensitized material arranged between the two sides and movable transversely of the casing, a focusing-screen normally lying in the recess and supports for the screen whereby it may be moved inwardly in line with the holder when the latter is moved to one side.

6. In a photographic camera, the combination with a casing having the lens and the side portion in rear thereof provided with a recess, and a film-holder guided in the casing and adapted to move transversely of the recess, of a focusing-screen located in said recess, movable supports for the screen, means for moving it and stops for limiting its movement inwardly when the holder is moved transversely and means operating to automatically move the former outwardly as the latter is returned to its normal position.

7. In a photographic camera, the combination with a casing having the forward side provided with the lens and guides on the casing and a film-holder supported therein and arranged in rear of the lens and movable transversely of the casing, a focusing-screen arranged in rear of the plate-holder and supporting-arms pivoted to the screen and casing, means for moving the screen inwardly in line with the film-holder when the latter is moved outwardly and catch devices for retaining the holder in the latter position.

8. In a photographic camera, the combination with a main casing having the forward side provided with a recess or chamber, a door adapted to close the latter having guides thereon and a lens-support adjustable on the guides, of a supplemental casing movable laterally of the main casing having the apertured front wall extending in rear of the recess or chamber and having film-chambers at the ends, a cover closing said chambers and the rear side of the front wall and a removable slide adapted to close the aperture in said wall.

9. In a photographic camera, the combination with a main casing having the forward side provided with a recess or chamber, a door adapted to close the latter having guides thereon and a lens-support adjustable on the guides, of a supplemental casing guided to move transversely of the main casing embodying a front wall provided with an exposure-aperture and film-chambers at each end of the wall, a cover closing said chambers and extending over the wall and a slide adapted to close the exposure-aperture in said wall, a focusing-screen, supporting devices connecting it with the main casing and means for projecting it beneath the supplemental casing when said casing is moved transversely and coöperating inclined surfaces on the screen and supplemental casing whereby the former will be automatically moved out of alinement with the latter when the parts are returned to their normal position.

10. In a photographic camera, the combination with a main casing having the recessed chamber at the front and the rear side provided with a recess, a door adapted to close the front chamber having guides and a lens-support adjustable thereon, of a vertically-movable supplemental casing guided in the main casing embodying a front wall extending in rear of the front chamber in the main casing provided with an exposure-aperture and having film-chambers lying on each side of said recess, a cover extending over the wall and inclosing the chambers and a slide for closing the aperture in the wall, a focusing-screen normally lying in the recess in the rear side of the main casing and supports for the latter whereby it may be moved inwardly when the supplemental casing is moved transversely in the main casing.

11. In a camera, the combination with the main casing having a lens and a rearwardly-movable focusing-screen in alinement therewith, of a roll-holder sliding on the casing between the lens and screen and having film-chambers arranged laterally beyond the screen.

12. In a camera, the combination with a main casing having a lens, and an exposure-aperture in rear thereof and a movable focusing-screen coöperating with said aperture, of a roll-holder embodying film-chambers at the sides, a central exposing-chamber between them having an aperture, and a slide for closing it, said holder guided to slide on the camera-casing transversely of the lens-axis and between the screen and lens.

13. In a camera, the combination with the main casing, the lens, the bellows, an open frame at the rear of the latter, and a movable focusing-screen coöperating with the frame, of a roll-holder movable on the casing transversely of the lens-axis and embodying a central chamber having a front opening to register with the open frame, a slide for closing the opening and film-chambers arranged at the side of the central chamber.

14. The combination with the main camera-casing having the central chamber open at the front, and the chambers at the sides thereof, the bellows connected to the rear of the central chamber and the rearwardly-movable focusing-screen, of the movable roll-holder embodying a casing having the film-chambers at the side arranged in the side chambers in the main casing, the film-passage between them having the front opening and the slide for closing it, said roll-holder being movable in the main casing longitudinally of the film-chambers to bring the film in the film-passage into the plane normally occupied by the screen.

15. The combination with the main camera-casing having the central chamber open at the front, the side chambers open at the top, an open frame at the rear of the central chamber and a rearwardly-movable focusing-screen coöperating therewith, of a vertically-movable roll-holder embodying a casing having the film-chamber arranged to slide vertically in the side chamber of the main casing and a film-passage between them having the aperture at the front, and a slide for closing it, and locking devices for holding the roll-holder in raised position above the focusing-screen.

16. In a camera and in combination, a box having a lens and a focusing-glass, and a film-holder associated therewith, carrying a supply-spool and winding-reel, adapted to be shifted relative thereto to carry the film into and out of the line of said lens and glass without changing the position of said film relative to its holder, substantially as described.

17. In a camera and in combination, a box having a lens, a focusing-glass, and a film-holder-receiving chamber interposed between the same, and a film-holder fitted to said chamber carrying a supply-spool and winding-reel, with means for shifting the film-holder into and out of the light-rays passing through said lens, substantially as described.

18. In a camera, the combination with a box having a lens and a focusing-glass, of a film-holder carrying a supply-spool and winding-reel, mounted therein to move the film bodily into and out of interposition between the lens and glass, without shifting the film in its holder, substantially as described.

19. In a camera, the combination with a box having a lens and focusing-glass, of a film-holder carrying a supply-spool and winding-reel, said holder being mounted therein to move the film into and out of register with said lens, without shifting the film within the holder, substantially as described.

20. In a camera, the combination with a box having a lens and focusing-glass, of a film-holder, carrying the entire film, mounted therein and shiftable in relation thereto to carry the film within said holder into and out of register with said lens, said holder having film-feeding mechanism associated therewith, substantially as described.

21. In a camera, and in combination, a box carrying a lens and focusing-glass, and a film-holder, carrying the entire film, movable into and out of said box to carry the film into the compass of the light-rays passing through said lens or out of the line of said lens and focusing-glass, substantially as described.

22. In a camera, the combination with the casing, the lens and focusing-screen, of a film-roll holder embodying the film-support and spool-holders, connected to the camera and movable bodily into and out of position between the lens and focusing-screen, one side of said holder coöperating with the camera to close the camera when moved outwardly.

23. In a camera and in combination, a box, a lens and focusing-glass associated therewith, said box having a film-holder-receiving chamber therein, a film-carrier movable into and out of said box, and means for excluding light from said chamber when the carrier is in its outward position, substantially as described.

24. In a camera and in combination, a box comprising a lens and shutter-operating section, a focusing-glass section, and a film-holder-receiving chamber interposed between said sections, and a film-carrier detachably attached 25. In a camera and in combination, a section carrying a lens and focusing-glass, and a film-holder telescopically mounted therein between said lens and focusing-glass, substantially as described.

26. In a camera and in combination, a section carrying a lens and a focusing-glass, and a film-holder detachably connected thereto and telescopically mounted therein, substantially as described.

27. In a camera and in combination, a lens and focusing-glass carrying section, having said glass permanently mounted therein, a film-holder section movably connected thereto to carry the film into and out of register with the lens, said holder-section having a single exposure-opening therein, and means for closing the same, substantially as described.

28. In a camera and in combination, a lens and focusing-glass carrying section, having said glass permanently mounted in the same, a film-holder section movably connected thereto to carry the film into and out of register with the lens, said holder-section having a single light-exposure opening therein designed to be registered with the lens, and shiftable means for closing the same, substantially as described.

29. In a camera and in combination, a lens and focusing-glass carrying section, having said glass permanently mounted in the same, a film-holder section movably connected thereto to carry the film into and out of register with the lens, said holder-section having a single light-exposure opening therein designed to be registered with the lens, and a slide for closing the same, substantially as described.

30. In a camera and in combination, a lens and focusing-glass carrying section, having said glass permanently mounted in the same, a film-holder section movably connected thereto to carry the film into and out of register with the lens, said holder-section having a single light-exposure opening therein designed to be registered with the lens, and a slide for closing the same, said slide being guided through the top of said holder-section substantially as described.

31. In a camera and in combination, a box, a lens and focusing-glass associated therewith, said box having a film-holder-receiving chamber therein, a film-carrier movable into and out of said box, and coacting portions on the box and holder, for closing said chamber to exclude the light therefrom substantially as described.

32. In a camera and in combination, a box, a lens and permanently-positioned focusing-glass associated therewith, a film-holder carrying a supply-spool and reel, said holder being movably mounted therein to shift the film in either of two positions relative to the lens and focusing-glass, and means for retaining the holder in either of said positions, substantially as described.

33. In a camera and in combination, a box, a lens and permanently-arranged focusing-glass associated therewith, a film-carrier including a carrying and receiving spool and means for shifting the film bodily in either of two positions relative to the lens and focusing-glass, while maintaining a fixed relation of said spools, substantially as described.

34. In a camera and in combination, a box, a lens and focusing-glass associated therewith, a film-holder movably mounted therein to shift the film in either of two positions relative to the lens and focusing-glass, and spring-clips for retaining the holder in either of said positions, substantially as described.

35. In a camera and in combination, a box, a lens, and permanently-arranged focusing-glass associated therewith, a film-holder movably mounted therein to shift the film in either of two positions relative to the lens, means for shifting the holder out of register with the said lens and focusing-glass, and means for supporting the holder in the latter position, substantially as described.

36. In a camera and in combination, a box, a lens and focusing-glass associated therewith, said glass being fixed permanently in the rear wall thereof, a film-holder movably mounted therein to shift the film in either of two positions relative to the lens, means for shifting the holder out of register with the said lens and focusing-glass, and spring-clips for supporting the holder in the latter position, substantially as described.

37. In a camera and in combination, a box, a lens and focusing-glass associated therewith, a film-holder movably mounted therein to shift the film in either of two positions relative to the lens, means for shifting the holder out of register with the said lens and focusing-glass, and spring-clips secured to the box engaging with the bottom of the holder for supporting said holder in the latter position, substantially as described.

38. In a camera and in combination, a box, a lens and focusing-glass associated therewith, a film-holder movably mounted therein to shift the film in either of two positions relative to the lens, and means for shifting the holder out of register with the said lens and focusing-glass, and spring-clips having operating parts projecting through the walls of said box, said clips coacting with the holder to support the same out of register with the lens and focusing-glass.

39. In a camera and in combination, a box, a lens, and focusing-glass associated therewith, a film-holder movably mounted therein to shift the film in either of two positions relative to the lens, means for shifting the holder out of register with the said lens and focusing-glass, and spring-clips arranged at the upper part of the side walls of the box, having operating parts projecting through the walls of said box, said clips coacting with the holder to support the same out of register with the lens and focusing-glass, substantially as described.

40. In a camera and in combination, a box, a lens and focusing-glass associated therewith, said box having a film-holder-receiving chamber, a film-holder, including a supply-roll and winding-reel, movably mounted in said chamber adapted to carry the film into either of two positions and guide members for the holder arranged in said chamber, substantially as described.

41. In a camera and in combination, a box, a lens and focusing-glass associated therewith, said box having a film-holder-receiving chamber, a film-holder movably mounted in said chamber adapted to carry the film into either of two positions, and vertical guide-strips secured to the walls of said chamber coacting with said holder, substantially as described.

42. In a camera and in combination, a box, a lens and focusing-glass associated therewith, said box having a film-holder-receiving chamber, a film-holder movably mounted in said chamber, said holder including a permanent front wall having an exposure-opening therein, guideways secured to said wall, and a slide for closing said opening guided in said ways, substantially as described.

43. In a camera and in combination, a box, a lens and focusing-glass associated therewith, said box having a film-holder-receiving chamber, and a film-holder carrying a supply-spool and a winding-reel, said holder being attached to said box and movable into and entirely out of said chamber, substantially as described.

44. In a camera and in combination, a box, a lens and focusing-glass associated therewith, said box having a film-holder-receiving chamber therein, and a film-holder connected to said box to be shifted into a position at rest within the chamber, and to be shifted into a second position at rest out of said chamber, substantially as described.

45. In a camera and in combination, a box, a lens and focusing-glass associated therewith, said box having a film-holder-receiving chamber therein and a film-holder connected to said box to be shifted into a position at rest within the chamber and to be shifted into a second position at rest out of said chamber, and means for closing said chamber to exclude the light when the holder is in the second position, substantially as described.

46. In a camera and in combination, a box, a lens and focusing-glass associated therewith, said box having a film-holder-receiving chamber therein, and a film-holder connected to said box to be shifted into a position at rest within the chamber, and to be shifted into a second position at rest out of said chamber, the bottom of said holder closing the space, normally closed by the top of the holder, when said holder occupies said second position, substantially as described.

47. In combination, in a camera, a box including a pivoted rear door, said box having a film-holder-receiving chamber therein in advance of said door, a lens associated with the box, a movable focusing-glass arranged forwardly of the door, and a film-holder connected to the box and adapted to be moved into and out of said chamber substantially as described.

48. In a camera, the combination with a box-section having a lens, a focusing-glass and a roll-holder-receiving chamber interposed between the two, of a film-holder connected to said section and designed to occupy the chamber therein comprising end roll-holding compartments and a film-passage between the two, including a movable member forming one wall of said passage, substantially as described.

49. In a camera, the combination with a box-section having a lens, a focusing-glass and a roll-holder-receiving chamber interposed between the two, of a film-holder carrying a supply-spool and a winding-reel, and comprising end chambers and a film-passage extending between the two, having means associated with the same for protecting the film and for exposing the same, and a connection between said holder and box-section for permitting the holder to be moved to occupy said chamber in the box-section or to be moved to occupy a position to one side of the chamber and a removable securing device for the holder, substantially as described.

50. In a camera, the combination with the casing the lens and focusing-screen, of a film-roll holder carrying the entire film, movable bodily into and out of position between the lens and focusing-screen and detachable catches for securing the holder in two positions and permitting its removal when desired.

51. In a camera, the combination with a box-section having a lens and a focusing-glass, of a film-holder carrying a supply-spool and a winding-reel and comprising end chambers and a film-passage extending between the two having means associated with the same for protecting the film and for exposing the same and a connection between said holder and box-section for permitting the holder to be moved bodily to occupy a position in alinement with the lens or a second position out of alinement with the lens.

CHARLES F. AMES.
HENRY A. REARSON.

Witnesses:
SAML. V. GALLAGHER,
ALFRED P. ALLIS.